(12) United States Patent
Tanahashi

(10) Patent No.: US 9,056,719 B2
(45) Date of Patent: Jun. 16, 2015

(54) AUTOMATIC STORAGE SYSTEM

(75) Inventor: Tetsuji Tanahashi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 139 days.

(21) Appl. No.: 14/008,136

(22) PCT Filed: Feb. 10, 2012

(86) PCT No.: PCT/JP2012/053055
§ 371 (c)(1), (2), (4) Date: Sep. 27, 2013

(87) PCT Pub. No.: WO2012/132569
PCT Pub. Date: Oct. 4, 2012

(65) Prior Publication Data
US 2014/0072392 A1    Mar. 13, 2014

(30) Foreign Application Priority Data

Mar. 29, 2011   (JP) .................................. 2011-071564

(51) Int. Cl.
*B65G 1/04* (2006.01)
*B66F 9/07* (2006.01)
(Continued)

(52) U.S. Cl.
CPC ................ *B65G 1/0421* (2013.01); *B66F 9/07* (2013.01); *B66F 9/0755* (2013.01); *B66F 9/141* (2013.01); *B65G 1/0407* (2013.01)

(58) Field of Classification Search
CPC .. B65G 1/0421; B65G 1/0407; B65G 1/0435; B65G 1/0492; B66F 9/0755; B66F 9/07; B66F 9/141
USPC ......... 414/266, 267, 268, 269, 270, 273, 277, 414/279, 281, 282
See application file for complete search history.

(56) References Cited

U.S. PATENT DOCUMENTS 5,833,427 A * 11/1998 Siegler et al. .................. 414/277
5,839,872 A * 11/1998 Goto et al. ..................... 414/280
(Continued)

FOREIGN PATENT DOCUMENTS

AT   EP 2433882 A1 *  3/2012
DE       10040492 A1 *  2/2002
(Continued)

OTHER PUBLICATIONS

English translation of Official Communication issued in corresponding International Application PCT/JP2012/053055, mailed on Oct. 10, 2013.

(Continued)

*Primary Examiner* — Kaitlin Joerger
(74) *Attorney, Agent, or Firm* — Keating & Bennett, LLP

(57) ABSTRACT

An automatic storage system includes a front rack and a rear rack, a stacker crane, and a crane controller. The front rack and the rear rack include a plurality of shelves located in a right and left direction and in an up and down direction. Each of the shelves includes a near-side storage portion and a far-side storage portion arranged in the depth direction. The stacker crane includes an elevator provided at the travelling vehicle such that the elevator can move up and down. The crane controller is programmed to control the elevator to move vertically between an upper stop position and a lower stop position when the article is transferred between the slide fork and the shelves. The upper stop position includes a far-side upper stop position corresponding to the far-side storage portion and a near-side upper stop position corresponding to the near-side storage portion. The crane controller controls the elevator such that the far-side upper stop position is higher than the near-side upper stop position.

15 Claims, 9 Drawing Sheets

(51) Int. Cl.
*B66F 9/075* (2006.01)
*B66F 9/14* (2006.01)

(56) References Cited

U.S. PATENT DOCUMENTS

| | | | |
|---|---|---|---|
| 6,619,902 B1* | 9/2003 | Castaldi et al. | 414/280 |
| 6,824,345 B2* | 11/2004 | Hansl et al. | 414/282 |
| 6,923,612 B2* | 8/2005 | Hansl | 414/277 |
| 8,740,542 B2* | 6/2014 | Wolkerstorfer | 414/807 |
| 8,753,060 B2* | 6/2014 | Ueda et al. | 414/277 |
| 8,790,061 B2* | 7/2014 | Yamashita | 414/280 |
| 8,827,620 B2* | 9/2014 | Toguri | 414/281 |
| 8,956,099 B2* | 2/2015 | Olszak et al. | 414/281 |
| 2005/0095093 A1* | 5/2005 | Hansl | 414/277 |
| 2006/0245862 A1* | 11/2006 | Hansl et al. | 414/281 |
| 2006/0285947 A1* | 12/2006 | Hansl et al. | 414/277 |
| 2007/0031219 A1* | 2/2007 | Besch | 414/277 |
| 2007/0144991 A1* | 6/2007 | Hansl et al. | 211/121 |
| 2010/0320010 A1* | 12/2010 | Bo | 180/41 |

FOREIGN PATENT DOCUMENTS

| | | | |
|---|---|---|---|
| EP | 2128047 A1 * | 12/2009 | |
| FR | 2709745 A1 * | 3/1995 | |
| JP | 2002-114320 A | 4/2002 | |
| JP | 2002-187603 A | 7/2002 | |
| JP | 2009-1380 A | 1/2009 | |
| WO | WO 2014034173 A1 * | 3/2014 | |
| WO | WO 2014038309 A1 * | 3/2014 | |
| WO | WO 2014038370 A1 * | 3/2014 | |

OTHER PUBLICATIONS

Official Communication issued in International Patent Application No. PCT/JP2012/053055, mailed on May 15, 2012.

* cited by examiner

AUTOMATIC STORAGE SYSTEM

BACKGROUND OF THE INVENTION

1. Field of the Invention

The present invention is related to an automatic storage system, particularly to an automatic storage system that can store two articles arranged side by side in a depth direction of a shelf.

2. Description of the Related Art

An automatic storage system includes a rack having a plurality of shelves that can store articles, and a stacker crane that can transfer the article between the shelves and the stacker crane. A conventional automatic storage system has been known that can store two articles arranged side by side in a depth direction of a shelf (refer to Japanese Laid-open Patent Publication 2009-1380). In the conventional automatic storage system, a shelf includes a near-side storage portion and a far-side storage portion arranged side by side in the depth direction. The near-side storage portion is located facing a travelling path of the stacker crane.

In the conventional automatic storage system, a transfer device of the stacker crane is constituted by a slide fork that can extend and contract within a length wherein the slide fork can reach the far-side storage portion. Accordingly, this slide fork has an extension and contraction distance longer than that of the slide fork for storing one article. When transferring the article to or from the shelf, the transfer device extends the slide fork by a length of the far-side storage portion or by a length of the near-side storage portion in order to transfer the article. When unloading an article to a shelf by the slide fork as a transfer device, an elevator is stopped at an upper stop position wherein an article-placed surface of the slide fork is positioned higher than the shelf, and then the slide fork is extended. In this state, the elevator is lowered to a lower stop position so that the article is placed onto the shelf. When loading the article from the shelf, the elevator is stopped at a lower stop position wherein the article-placed surface of the slide fork is lower than the shelf, and then the slide fork is extended. In this state, the elevator is hoisted to the upper stop position so that the article is scooped up from the shelves and is placed onto the article-placed surface.

In the conventional automatic storage system having the far-side storage portion and the near-side storage portion, an extension and contraction distance of the transfer device is longer. Accordingly, depending on whether at the near-side storage portion or at the far-side storage portion, deflection amounts of the transfer device during extension thereof may be different from each other. As a result, in the conventional stacker crane, when unloading and loading the article, an upper position where the elevator is stopped higher than the shelf as a transport destination is set at a position higher than the shelf considering deflection when extending the slide fork to the far-side storage portion. Therefore, the lowering time when transferring the article from the upper stop position to the shelf becomes longer, so that the time when transferring the article becomes longer.

SUMMARY OF THE INVENTION

Preferred embodiments of the present invention shorten a time required to transfer an article in an automatic storage system that can store articles at two places in a depth direction.

In the description below, a plurality of preferred embodiments of the present invention will be explained. Various features, characteristics, elements, arrangements, etc. of the preferred embodiments of the present invention can be combined arbitrarily as required or desired.

According to one aspect of a preferred embodiment of the present invention, an automatic storage system for storing articles includes a rack, a stacker crane, and a crane controller. The rack includes a plurality of shelves arranged in a first horizontal direction and an up and down direction. The stacker crane includes a vehicle, an elevator, and a transfer device. The vehicle is movable along the rack in the first horizontal direction. The elevator is provided at the vehicle so as to move up and down. The transfer device is provided at the elevator and configured to hold the article and transfer the article between the transfer device and the shelves by expanding toward the shelf and contracting away from the shelf. Each of the shelves includes a near-side storage portion near the stacker crane and a far-side storage portion far from the stacker crane. The near-side storage portion and the far-side storage portion are arranged along a second horizontal direction perpendicular or substantially perpendicular to the first horizontal direction. The crane controller is configured and programmed to control the elevator to move vertically between an upper stop position and a lower stop position when the article is transferred between the transfer device and the shelves. The upper stop position includes a far-side upper stop position corresponding to the far-side storage portion and a near-side upper stop position corresponding to the near-side storage portion. The crane controller controls the elevator such that the far-side upper stop position is higher than the near-side upper stop position.

In this automatic storage system, when an article is to be transferred to or from a shelf as a transport destination, upper stop positions are different between at the far-side storage portion and the near-side storage portion. In other words, the far-side upper stop position when the article is transferred to the far-side storage portion, whose extension and contraction length is longer and deflection is larger, is set higher than the near-side upper stop position when the article is transferred to the near-side storage portion, whose extension and contraction length is shorter and deflection is smaller. Accordingly, an ascending and descending distance of the elevator becomes shorter when the article is transferred to or from the near-side storage portion. For example, when an article is unloaded to the near-side storage portion, since the elevator just has to be lowered from the near-side upper stop position, which is lower than the far-side upper stop position, the lowering time is significantly reduced. In addition, when an article is loaded from the near-side storage portion, since the elevator just has to be hoisted from the lower stop position to the near-side upper stop position, the ascending time is significantly reduced. As a result, the ascending and descending time of the elevator is significantly reduced, thus significantly reducing the time required to transfer the article.

Preferably, the automatic storage system further includes a stop position detector configured to detect whether or not the elevator is located at the upper stop position.

Preferably, the stop position detector detects whether or not the elevator is located at the lower stop position.

Preferably, the stop position detector includes a reflector provided at the elevator, and a distance sensor provided at the vehicle facing upward, and configured to emit a laser beam toward the reflector and measure a distance to the elevator based on the reflected laser beam.

Preferably, the crane controller sets the far-side upper stop position and the near-side upper stop position such that the higher the shelf is, the larger a difference between the far-side upper stop position and the near-side upper stop position is.

In this case, if the elevator is hoisted to a shelf at a higher position in order to transfer an article to the shelf at the higher position, the deflection of the mast guiding the elevator becomes larger. And if a guide rail is provided in the upper portion and the stacker crane includes upper guide rollers, the mast may tilt due to a gap between the mast and the guide rollers. As a result, depending on the vertical position of the shelf as a transport destination, a deflection amount of the transfer device is changed. Accordingly, even if the vertical positions of the shelves are different from each other, the far-side upper stop position and the near-side upper stop position are changed such that, the higher the shelf is, the larger the difference between the far-side upper stop position and the near-side upper stop position is. As a result, even if vertical positions of the shelf as a transport destination are different from each other, the transfer time is significantly reduced.

Preferably, the stop position detector includes a far-side upper stop position detector configured to detect whether or not the elevator is located at the far-side upper stop position, and a near-side upper stop position detector configured to detect whether or not the elevator is located at the near-side upper stop position. The crane controller determines whether the elevator is located at the upper stop position using either the far-side upper stop position detector or the near-side upper stop position detector, depending on whether an article is to be stored to the far-side upper stop position or to the near-side upper stop position of the shelf as a transport destination.

In this case, since the upper stop positions are changed by switching the far-side upper-stop-position detector and the near-side upper stop position detector, it is possible to detect the far-side upper stop position and the near-side upper stop position at low cost.

Preferably, the far-side upper stop position detector includes a far-side photoelectric detector including a first light emitting portion and a first light receiving portion, and far-side detection elements provided to correspond to the shelves and configured to block the light emitted from the first light emitting portion. The near-side upper stop position detector includes a near-side photoelectric detector including a second light emitting portion and a second light receiving portion, and near-side detection elements provided to correspond to the shelves and configured to block the light emitted from the second light emitting portion.

Preferably, the vehicle includes a first mast and a second mast configured to guide the elevator. The far-side photoelectric detector and the near-side photoelectric detector are disposed at two ends, in the first horizontal direction, of the elevator at the same height. The far-side detection elements are shield plates for the far-side, which is disposed at the first mast so as to correspond to vertical positions of the shelves. The near-side detection elements are shield plates for the near-side, which are disposed at the second mast so as to correspond to vertical positions of the shelves.

According to various preferred embodiments of the present invention, the far-side storage portion as a transport destination, in which the extension and contraction length and the deflection is large, is located higher than the near-side upper stop position as a transport destination, in which the extension and contraction length is shorter and the deflection is smaller. Accordingly, the descending distance of the elevator when unloading the article to the near-side storage portion becomes shorter. As a result, the lowering time of the elevator becomes shorter, thus significantly reducing the time required to transfer the article.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
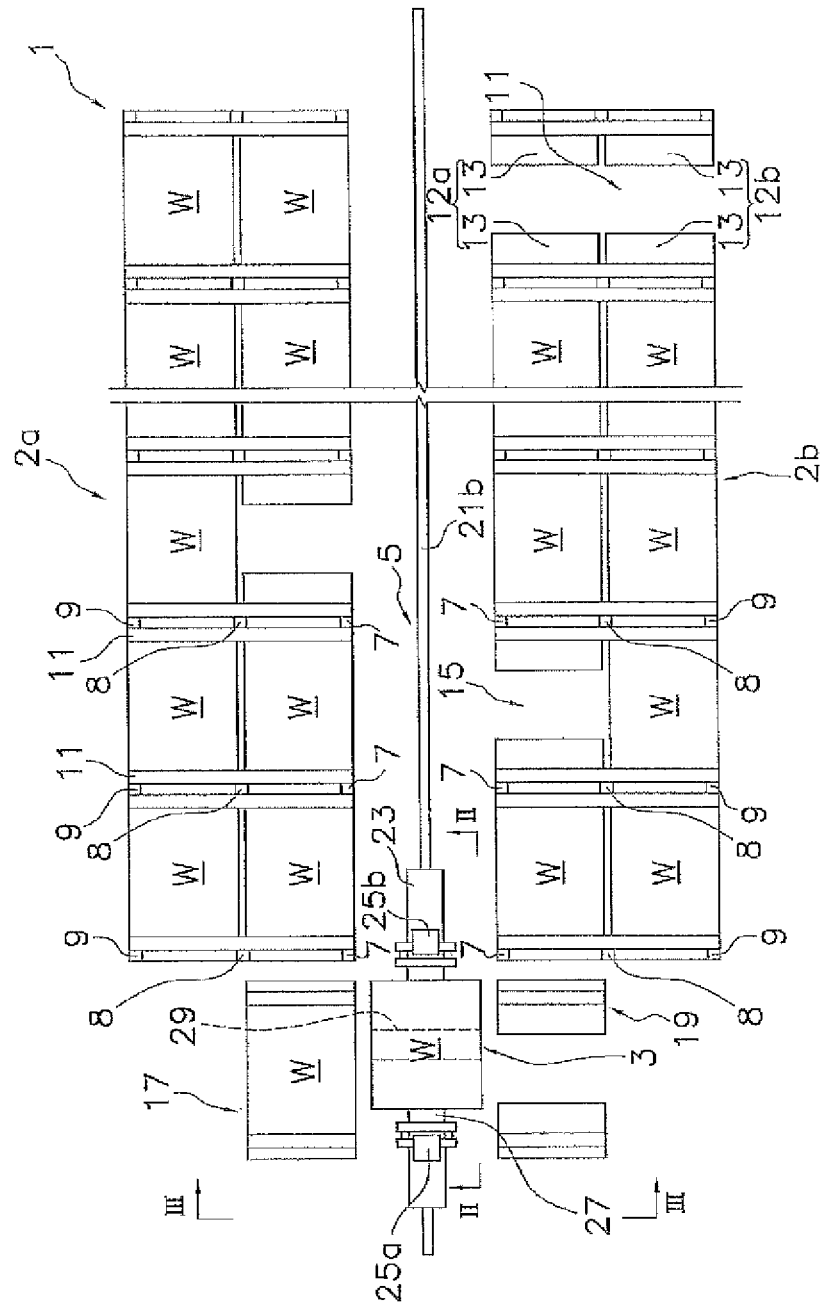
FIG. 1 is a schematic plane view of an automatic storage system including a preferred embodiment of the present invention.

Below, an automatic storage system 1 according to a preferred embodiment of the present invention will be described. In this preferred embodiment, a vertical direction in FIG. 1 is referred to as a front-and-back X direction of the automatic storage system 1, and a right and left direction in FIG. 1 is referred to as a right-and-left Y direction of the automatic storage system 1. The front-and-back X direction is one example of a second horizontal direction. The right-and-left Y direction is one example of a first horizontal direction.

As shown in FIG. 1, the automatic storage system 1 preferably includes a front rack 2a, a rear rack 2b, and a stacker crane 3 which can travel between the front rack 2a and the rear rack 2b.

Figure 2:
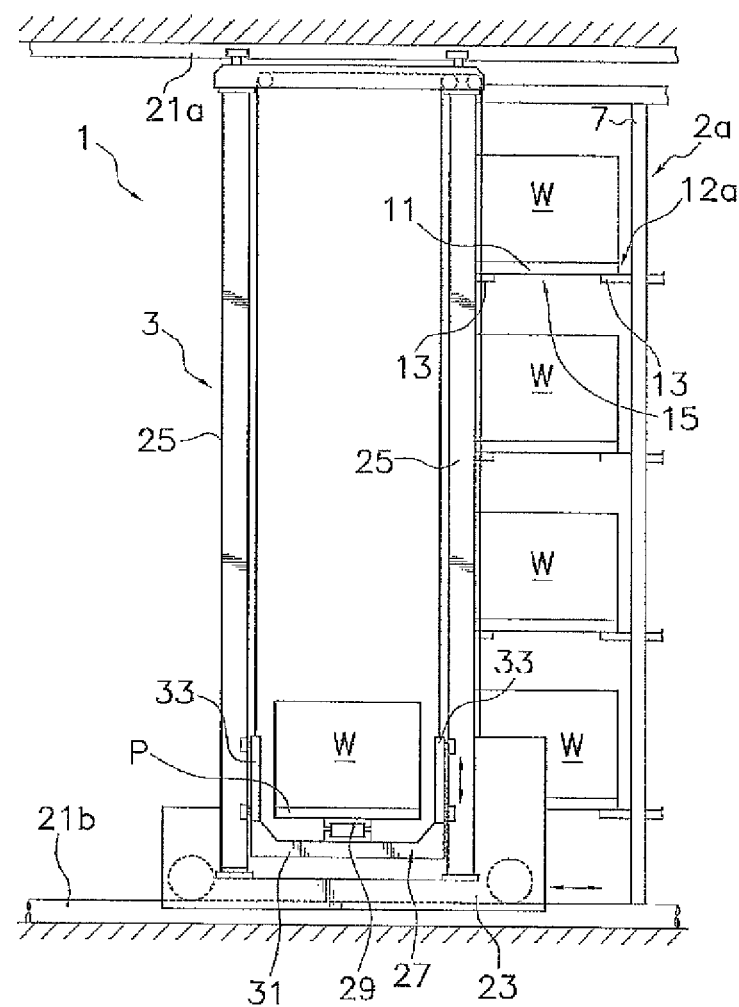
FIG. 2 is a cross-sectional view along line II-II of FIG. 1 for explaining about a rack and a stacker crane.

The front rack 2a and the rear rack 2b are located on both sides in a front and back direction of a travelling path of the stacker crane 3 extending in the right-and-left Y direction. Each of the front rack 2a and the rear rack 2b includes a number of first columns 7 near a travelling path 5 arranged in the right and left direction with a predetermined gap with each other, second columns 9 arranged far away from the travelling path 5 with a predetermined gap with each other, intermediate columns 8 arranged between first columns 7 and the second columns 9, a number of shelves 11 each of which is located between the adjacent first column 7 and second column 9. In this preferred embodiment, one shelf 11 preferably includes a near-side storage portion 12a and a far-side storage portion 12b located along in a depth direction. The depth direction extends away from the travelling path 5 in the front-and-back X direction (second horizontal direction). Each of the near-side storage portion 12a and the far-side storage portion 12b includes a pair of article supporting members 13. Accordingly, one shelf 11 can store two articles W located in the depth direction. On the near-side storage portion 12a and the far-side storage portion 12b, as apparent from FIG. 1, the stacker crane 3 can place an article W using a center reference. Each of the articles W is, as shown in FIG. 2, placed on a palette P, and is moved together with the palette P. In addition, between the pair of article supporting members 13 arranged in the right and left direction, a gap 15 through which the fork passes is defined to allow a later-described slide fork 29 to move in the vertical direction.

On a left lateral side of the front rack 2a, a storage station 17 is provided to store an article W. On a left lateral side of the rear rack 2b, a retrieval station 19 is provided to retrieve an article W. The storage station 17 and the retrieval station 19 can store and retrieve one article W.

Figure 3:
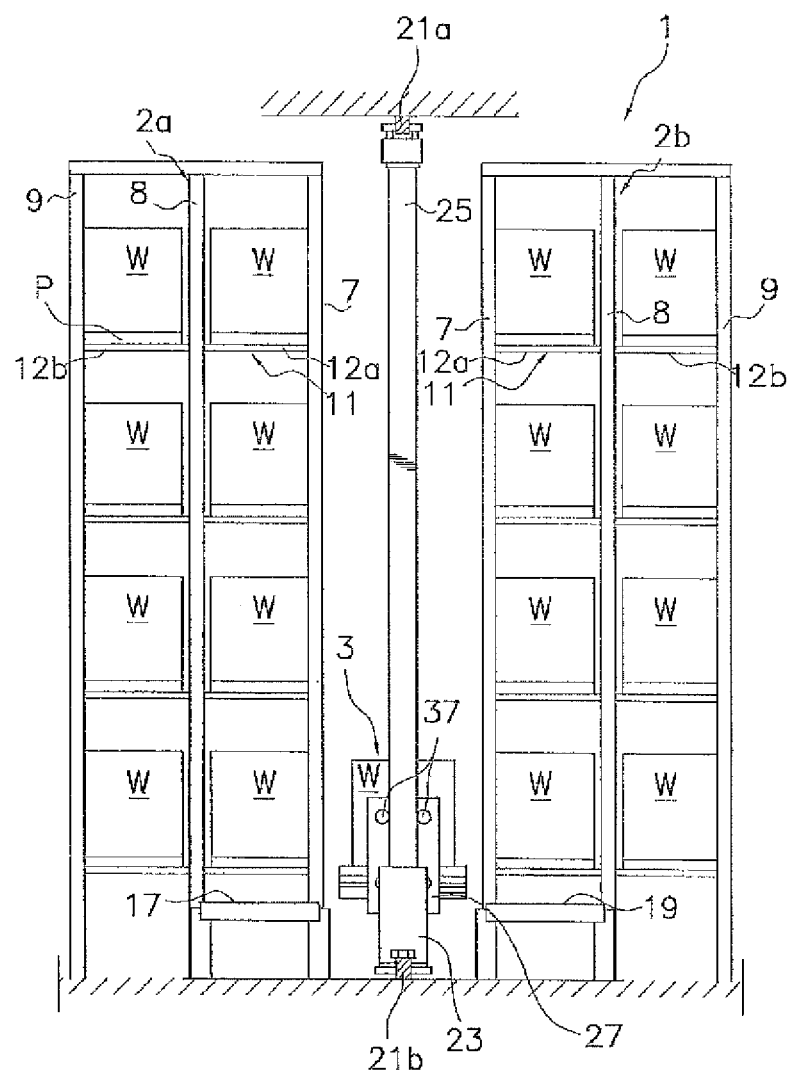
FIG. 3 is a cross-sectional view along line III-III of FIG. 1 for explaining about a rack and a stacker crane.

As shown in FIG. 2 and FIG. 3, an upper guide rail 21a and a lower guide rail 21b are provided along the travelling path 5. The stacker crane 3 is guided by the upper guide rail 21a and the lower guide rail 21b such that the stacker crane 3 can travel in the right-and-left Y direction. The stacker crane 3 transports articles W among the lots of near-side storage portions 13a and far-side storage portions 13b, the storage station 17, and the retrieval station 19.

The stacker crane 3 includes a travelling vehicle 23, an elevator 27 attached to a left mast 25a and a right mast 25b provided in the travelling vehicle 23 such that the elevator 27 can ascend and descend, a slide fork 29 (one example of the transfer device) provided in the elevator 27 such that slide fork 27 can slide in the front and back direction by an advancing and receding mechanism (not shown). The travelling vehicle 23 can travel on the lower guide rail 21b. The left mast 25a and the right mast 25b are connected with each other at their upper portions, and the connecting portion is guided by the upper guide rail 21a.

Figure 4:
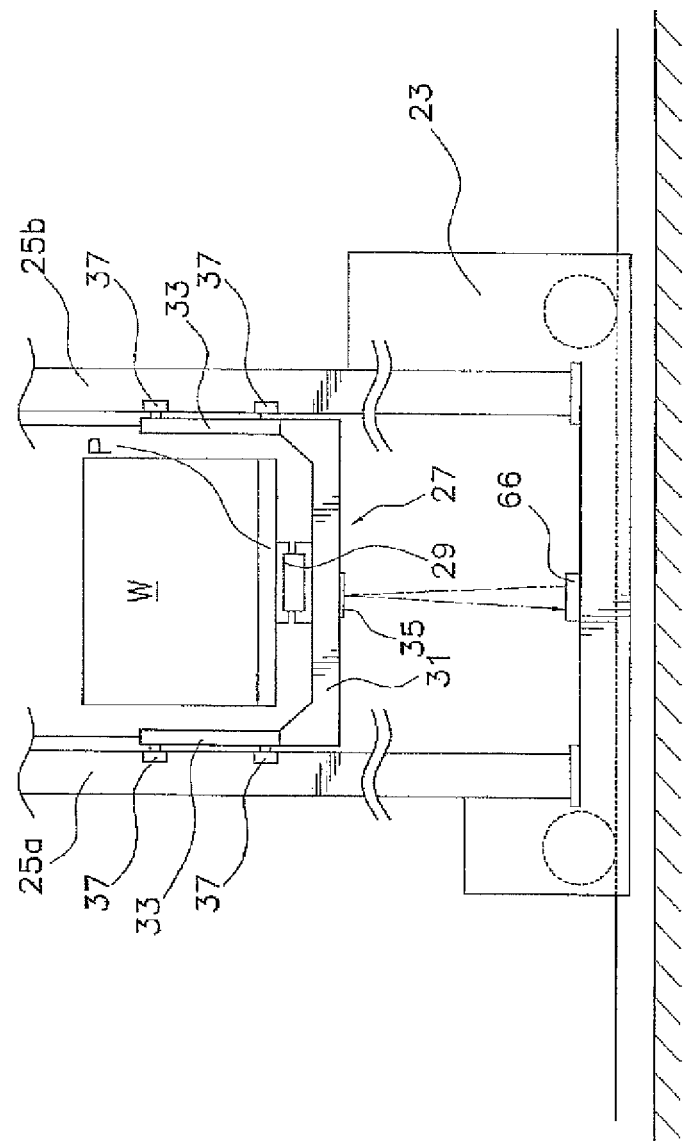
FIG. 4 is an enlarged view showing location of a stop-position detector.

The elevator 27 includes a placement portion 31 opposed to the travelling vehicle 23, and wall portions 33 on both right and left sides extending upward from right and left ends of the placement portion 31. On a bottom surface of the placement potion 31, as shown in FIG. 4, a reflecting plate 35 is provided as a detection element for a stop-position detector 66 that detects a stop position of the elevator 27 in the vertical direction in each of the shelves 11. The stop-position detector 66 preferably includes a distance sensor that generates lasers, for example. The stop-position detector 66 is provided in the travelling vehicle 23, facing upward. The stop-position detector 66 emits a laser light toward the reflecting plate 35 and receives the reflected laser light in order to calculate a height of the elevator 27.

In the wall portion 33, elevating guide rollers 37 are rotatably attached to guide the left mast 25a and the right mast 25b. The elevating guide rollers 37 pinch front and back surfaces of the left mast 25a and the right mast 25b, and the set of the rollers 37 are spaced away from each other in the vertical direction.

Figure 5A:
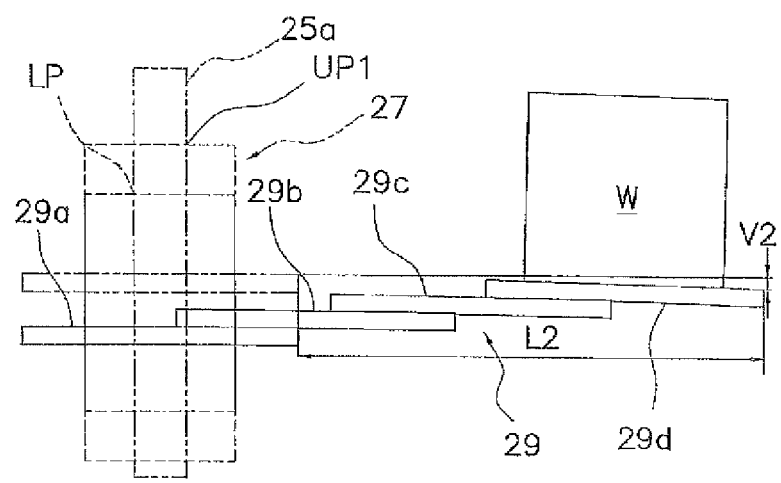
FIG. 5A is a schematic view when a slide fork extends to a far-side storage portion.
Figure 5B:
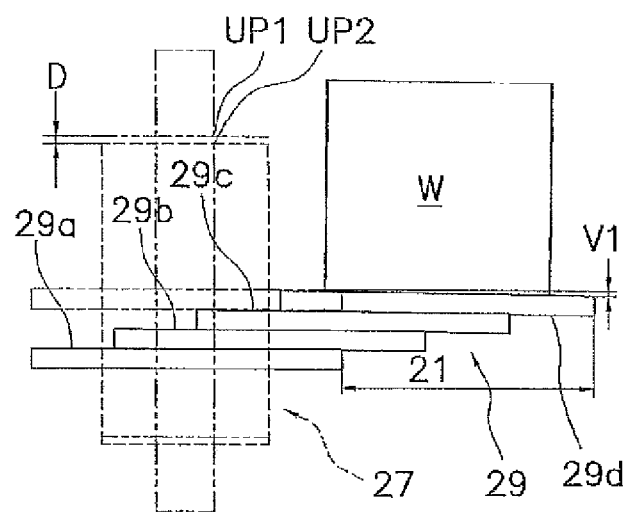
FIG. 5B is a schematic view when the slide fork extends to a near-side storage portion.

The slide fork 29 includes, as shown in FIG. 5A and FIG. 5B, a first fork 29a, a second fork 29b, a third fork 29c, and a fourth fork 29d. The first fork 29a, the second fork 29b, the third fork 29c, and the fourth fork 29d are connected with each other by a known telescopic structure, which is constituted by a linear guiding groove, a rack-and-pinion, and a chain-and-sprocket. The first fork 29a is fixed to the placement portion 31 of the elevator 27. The second fork 29b is connected to the first fork 29a such that the second fork 29b can extend and contract. The third fork 29c is connected to the second fork 29b such that the third fork 29c can extend and contract. The fourth fork 29d is connected to the third fork 29c such that the fourth fork 29d can extend and contract.

The deflection of the whole slide fork 29, which is caused by the weight of the article W, is changed depending on whether the sidle fork 29 extends toward the far-side storage portion 12b by the second length L2 in FIG. 5A, or the slide fork 29 extends toward the near-side storage portion 12a by the first length L1 as shown in FIG. 5B. In other words, the deflection amount V1 when the slide fork 29 extends toward the near-side storage portion 12a is smaller than the deflection amount V2 when the slide fork 29 extends toward the far-side storage portion 12b. Accordingly, the upper stop positions, where the elevator 27 is stopped higher than the shelf 11 when the article W is transferred to the shelf 11 from the stacker crane 3, are different from each other depending on whether the article W is transferred to the near-side storage portion 12a or the far-side storage portion 12b. For example, as shown in FIG. 5B, the far-side upper stop position UP2 preferably is higher than the near-side upper stop position UP1 by about 50 mm, for example. Furthermore, as shown in FIG. 5A, the lower stop position LP, where the slide fork 29 is lowered to unload the article W to the shelf 11, preferably is the same or substantially the same in height between the near-side storage portion 12a and the far-side storage portion 12b. These stop positions are calculated based on the distance detected by the stop-position detector 66.

The near-side upper stop position UP1, the far-side upper stop position UP2, and the lower stop position LP are used to load the article W from the shelf 11 to the stacker crane 3 as well. When loading the article, the elevator 27 is stopped at the lower stop position LP, and the slide fork 29 is extended. Then, the elevator 27 is hoisted up to the near-side upper stop position UP1 or the far-side upper stop position UP2 to scoop the article W. Finally, the slide fork 29 is contracted so that the article W is placed on the elevator 27.

Figure 6:
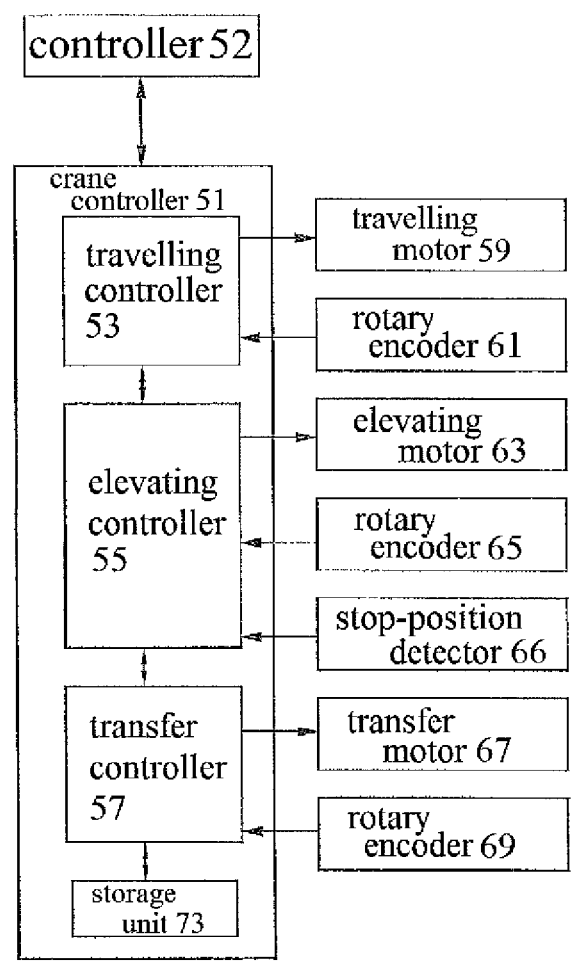
FIG. 6 is a function block diagram of a crane controller of the stacker crane.

Next, referring to FIG. 6, a crane controller 51 of the stacker crane 3 will be described. The crane controller 51 is preferably installed in each of the stacker cranes 3, and can communicate with a controller 52 that is configured and programmed to control the whole of the automatic storage system 1. The crane controller 51 preferably includes computer hardware such as a CPU and memory, and is expressed by a function configuration realized by cooperation of the computer hardware and software in FIG. 6. The crane controller 51 includes computer hardware such as a CPU and memory, and is expressed as a function block realized by cooperation of the computer hardware and software in FIG. 6.

The crane controller 51 includes a travelling controller 53, an elevating controller 55, a transfer controller 57, and a storage unit 73. The travelling controller 53 is configured and programmed to control travel and stop of the travelling vehicle 23, and is connected to a travelling motor 59 and a rotary encoder 61. The elevating controller 55 is configured and programmed to raise and lower the elevator 27 along the left mast 25a and the right mast 25b, and is connected to an elevating motor 63, a rotary encoder 65, and the stop-position detector 66. The transfer controller 57 is configured and programmed to move the slide fork 29 in the front and back direction, and is connected to a transfer motor 67 and a rotary encoder 69. The storage unit 73 stores data acquired via the controller 52, which are related to a shelf as a transport destination or a transport source for articles to be transported, for example.

Referring to a flowchart in FIG. 7, an operation of unloading an article from the stacker crane 3 to the shelf 11 will be described. Although "actions such as travelling, lifting, and transferring" of the stacker crane 3 are executed by the controllers, the motors and the sensors illustrated in FIG. 6, actions of the above-described components will not be explicitly described for simplifying the explanation in the below explanation.

Figure 7:
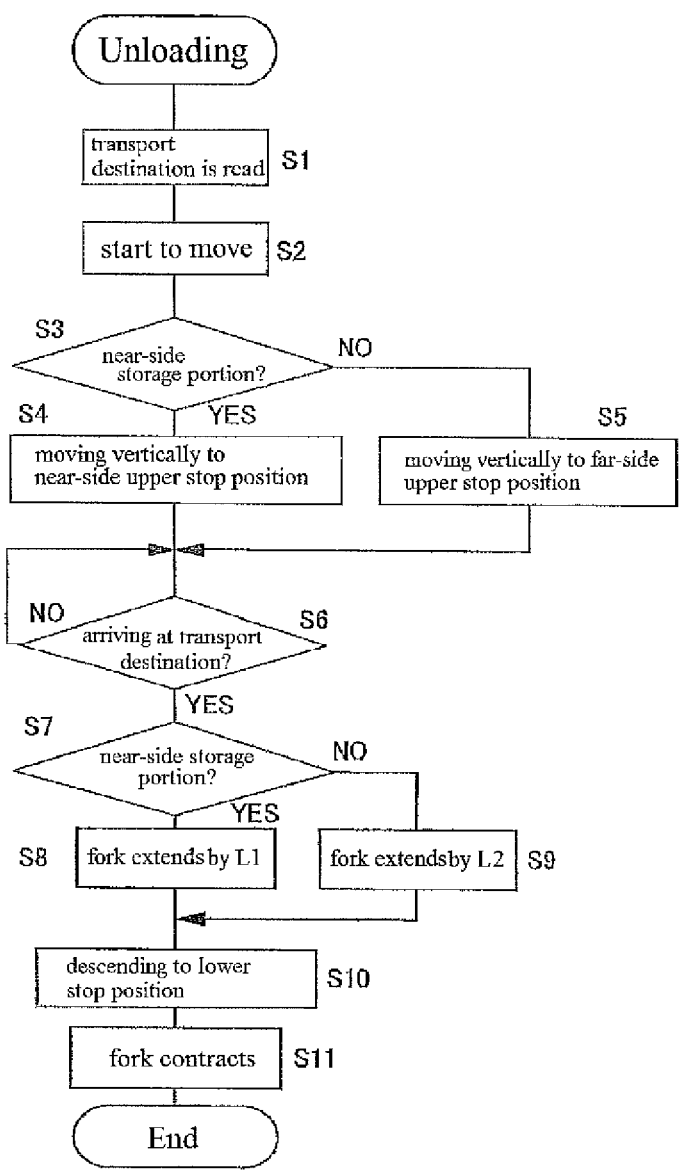
FIG. 7 is a flowchart showing the unloading operation by the stacker crane.

In step S1 in FIG. 7, the data about the transport destination is read via the controller 52, and the data is stored in a shelf-location storage area of the storage unit 73. Accordingly, the shelf location is set. In this storage area, the following information is stored, e.g., whether the front rack 2a or the rear rack 2b of shelves 11 is selected, which position in the vertical direction and right and left direction is selected, and whether the far-side storage portion 12b or the near-side storage portion 12a is selected. In step S2, the travelling controller 53 and the elevating controller 55 starts to move the article W to a shelf 11 as a transport destination. In step S3, it is determined whether or not the transport destination is the near-side storage portion 12a. If it is determined that the transport destination is the near-side storage portion 12a, the process proceeds to step S4, and the elevator 27 is raised or lowered to the near-side upper stop position UP1. If it is determined that the transport destination is the far-side storage portion 12b, the process proceeds from step S3 to step S5. In step S5, the elevator 27 is raised or lowered to the far-side upper stop position UP2. At this time, as described above, the near-side upper stop position UP1 is a position lower than the far-side upper stop position UP2. This is because the deflection amount V1 of the slide fork 29 when the article W is unloaded to the near-side storage portion 12a is smaller than the deflection amount V2 when the article W is unloaded to the far-side storage portion 12b.

The far-side upper stop position UP2 is set by actually measuring the deflection amount when the heaviest article W is unloaded to the far-side storage portion 12b, for example. For example, the far-side upper stop position UP2 is set such that if the actually measured deflection occurs, the value of the far-side upper stop position UP2 will be set such that the article W placed on the slide fork 29 is higher than the article supporting members 13 of the shelf 11 preferably by about 10 mm to about 30 mm, for example. The near-side upper stop position UP1 will be actually measured and set as well.

If the process in step S4 or step S5 is finished, the process proceeds to step S6. In step S6, it waits for the elevator 27a to arrive at a shelf 11 as a transport destination. If the elevator 27 arrives at the shelf 11 as a transport destination, the process proceeds to step S7. In step S7, as in step S3, it is determined whether or not the transport destination is the near-side storage portion 12a. If it is determined that the transport destination is the near-side storage portion 12a, the process proceeds to step S8, and the slide fork 29 is extended by the first length L1 illustrated in FIG. 5B. If it is determined that the transport destination is the far-side storage portion 12b, the process proceeds from step S7 to step S9, and the slide fork 29 is extended by the second length L2 illustrated in FIG. 5A. If the process in step S8 or step S9 is finished, the process proceeds to step S10. In step S10, the elevator 27 is lowered to the lower stop position LP. Accordingly, the article supporting members 13 of the shelf 11 scoop the article W, and the article W is transferred to the near-side storage portion 12a or the far-side storage portion 12b of the shelf 11. In step S11, the slide fork 29 is contracted so as to finish the unloading.

In this example, in a case of unloading the article W to the near-side storage portion 12a, the lowering distance when the elevator 27 is lowered from the near-side upper stop position UP1 to the lower stop position LP is shortened so as to significantly reduce the lowering time.

Referring to a flowchart in FIG. 8, an operation of loading the article W from the shelf 11 to the stacker crane 3 will be described. Although "actions such as travelling, lifting, and transferring" of the stacker crane 3 are executed by the controllers, the motors and the sensors illustrated in FIG. 6, actions of the above-described components will not be explicitly described for simplifying the explanation in the below explanation.

Figure 8:
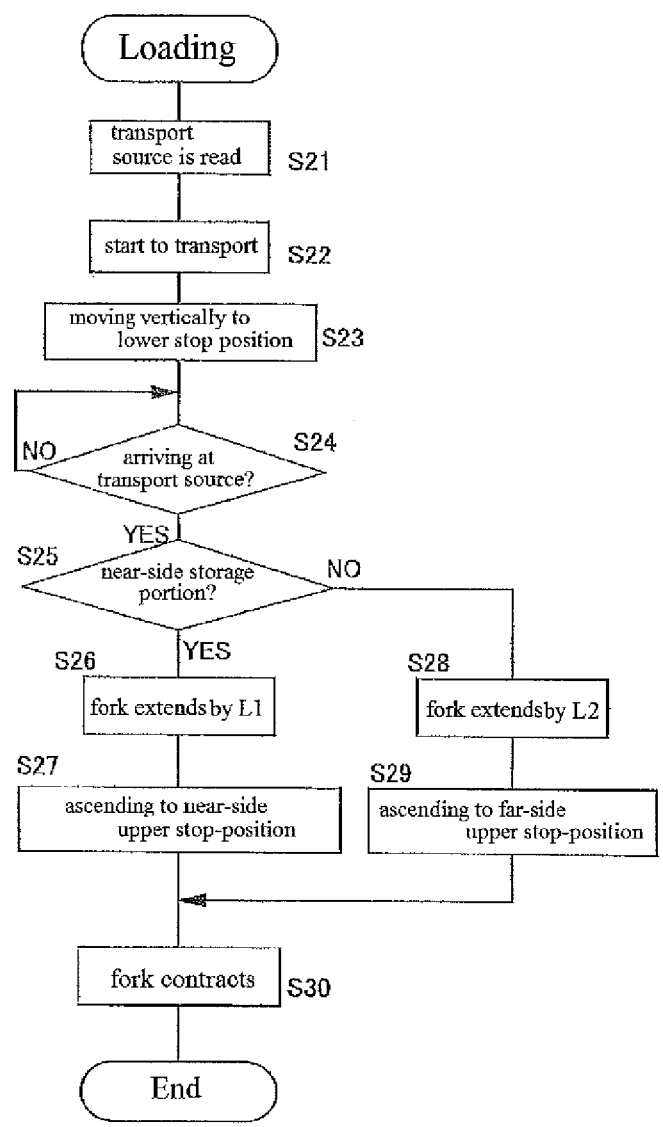
FIG. 8 is a flowchart showing the unloading operation by the stacker crane.

In step S21 in FIG. 8, data about the transport source is read via the controller 52, and the data is stored in a shelf-location storage area of the storage unit 73. Accordingly, the shelf location is set. In this storage area, the following information is stored, e.g., whether the front rack 2a or the rear rack 2b of shelves 11 is selected, which position in the vertical direction and right and left direction is selected, and whether the far-side storage portion 12b or the near-side storage portion 12a is selected. In step S22, the travelling controller 53 and the elevating controller 55 starts to move the article to the shelf 11 as a transport source. In step S23, the elevator 27 is raised or lowered to the lower stop position LP. In step S24, it waits for the elevator 27 arrives at the shelf 11 as a transport source. If the elevator 27 arrives at the shelf as a transport source, the process proceeds to step S25, it is determined whether or not the transport source is the near-side storage portion 12a. If it is determined that the transport source is the near-side storage portion 12a, the process proceeds from step S25 to step S26. In step S26, the slide fork 29 is extended by first length L1. In step S27, the elevator 27 is raised to the near-side upper stop position UP1. Accordingly, the slide fork 29 scoops an article W on the shelf 11, i.e., the article W is placed on the slide fork 29.

On the other hand, if it is determined that the transport source is the far-side storage portion 12b in step S25, the process proceeds to step S28. In step S28, the slide fork 29 is extended by the second length L2. In step S29, the elevator 27 is hoisted up to the far-side upper stop position UP2. Accordingly, the slide fork 29 scoops an article W on the shelf 11, i.e., the article W is placed on the slide fork 29. If the process of step S27 or step S29 is finished, the process proceeds to step S30. In step S30, the slide fork 29 is contracted to the elevator 27, thus finishing the loading.

In this example, when loading the article W from the near-side storage portion 12a, the ascending distance of the elevator 27 which is placed on the near-side storage portion 12a when the elevator 27 is hoisted from the lower stop position LP to the near-side upper stop position UP1 becomes shorter, thus reducing the ascending time.

Although one preferred embodiment according to the present invention was explained above, the present invention is not limited to the above-described preferred embodiment. The preferred embodiments can be altered in various ways without departing from the scope of the present invention. Particularly, a plurality of preferred embodiments and variations can be arbitrarily combined with each other as necessary.

Figure 9:
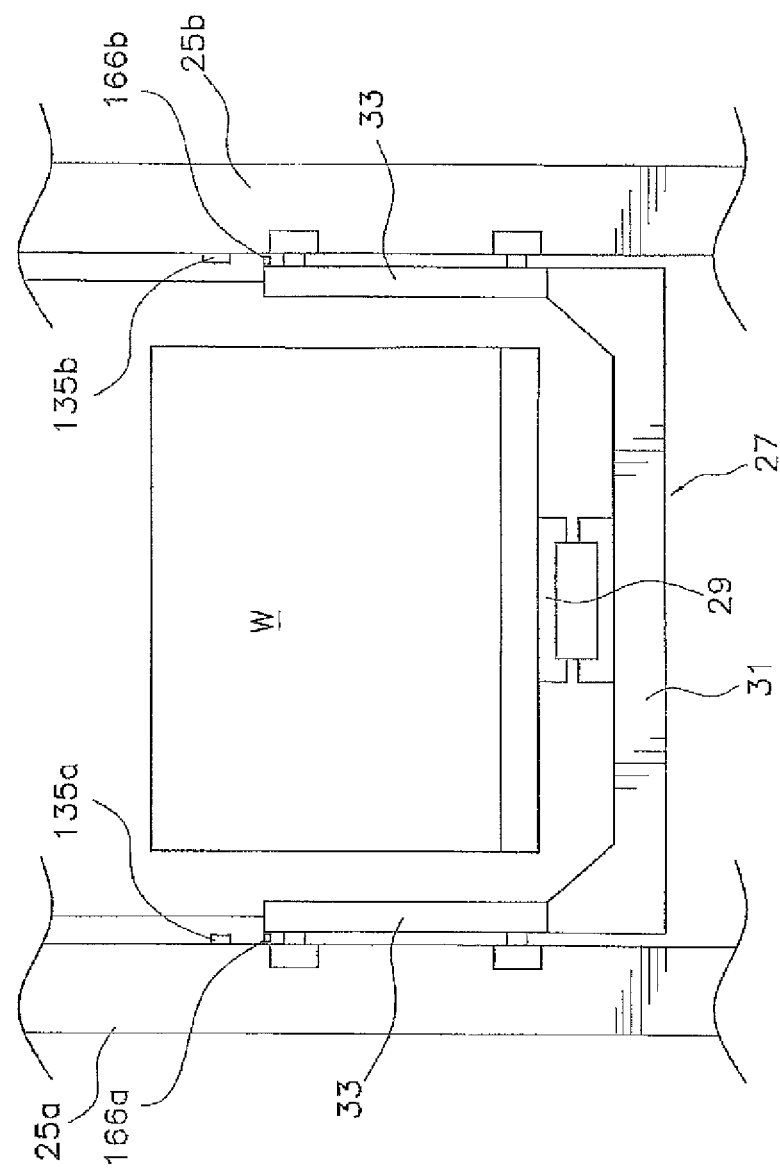
FIG. 9 is an enlarged view showing location of the stop-position detector in another preferred embodiment of the present invention.

Although a distance sensor is preferably used as a stop-position detector 66 in the above-described preferred embodiment, the present invention is not limited to this example. In FIG. 9, a photo-transmitting and photo-receiving optoelectronic detector is preferably used as a near-side stop-position detector 166a and a far-side stop-position detector 166b. The optoelectronic detector preferably is horseshoe-shaped, for example, and includes a photo-transmitter and photo-receptor. The near-side stop-position detector 166a is provided in a wall portion 33 on left side in FIG. 9, e.g., an upper portion of the wall portion 33. The far-side stop-position detector 166b is provided in a wall portion 33 on the right side in FIG. 9 at the same height of that of the near-side stop-position detector 166a. As detection elements, near-side shield plates 135a and far-side shield plates 135b are provided on the left mast 25a and the right mast 25b, corresponding to shelves 11 arranged in the vertical direction. The far-side shield plate 135b is longer than the near-side shield plate 135a in the vertical direction. The lower end of the far-side shield plate 135b and the lower end of the near-side shield plate 135a are located at the same height. Accordingly, the upper end of the far-side shield plate 135b is located higher than the upper end of the near-side shield plate 135a. The upper ends of the near-side shield plate 135a and the far-side shield plate 135b are used to detect the upper stop position of the elevator 27, and the lower ends of the near-side shield plate 135a and the far-side shield plate 135b are used to detect the lower stop position of the elevator 27.

According to the above-described configuration, depending on which storage unit in the shelf 11 is chosen as a portion to or from which an article W is transferred, a stop-position detector is chosen to be used. For example, if the article W is transferred to or from the far-side storage portion 12b, the far-side stop-position detector 166b is used. If the article W is transferred to or from the near-side storage portion 12a, the near-side stop-position detector 166a is used.

Although the lower stop position preferably is set constant regardless of whether the near-side storage portion 12a or the far-side storage portion 12b is concerned in the above-described preferred embodiment, different lower stop positions may be set depending on whether it is at the near-side storage portion 12a or the far-side storage portion 12b. For example, as at the upper stop position, the lower stop position of the near-side storage portion 12a may be set higher than the lower stop position of the far-side storage portion 12b.

Although a distance laser using a laser is preferably used as a stop-position detector in the above-described preferred embodiment, the present invention is not limited to this example. For example, a linear scale may be used located between the elevator and the mast.

Although deflection of the left mast 25a and the right mast 25b caused by the change of the shelf 11 in the vertical position is not considered in the above-described preferred embodiment, it may set the near-side upper stop position and the far-side upper stop position, considering the deflection of the left mast 25a and the right mast 25b and further considering the position of the shelf 11 in the vertical direction.

The above-described preferred embodiments can be expressed as follows.

The automatic storage system 1 is a system for storing articles. The automatic storage system 1 includes a front rack 2a and a rear rack 2b, a stacker crane 3, and a crane controller 51. The front rack 2a and the rear rack 2b include a plurality of shelves 11 arranged in the right and left direction and an up and down direction. Each of the shelves 11 includes a near-side storage portion 12a and a far-side storage portion 12b arranged side by side in a depth direction. The stacker crane 3 includes a travelling vehicle 23, an elevator 27, and a slide fork 29. The travelling vehicle 23 is movable along the front rack 2a and the rear rack 2b in the right and left direction. The elevator 27 is provided at the travelling vehicle 23 so as to move up and down. The slide fork 29 is provided at the elevator 27 and configured to hold the article W and transfer the article W between the slide fork 29 and the shelves 11 by expanding toward the shelf 11 and contracting away from the shelf 11. The crane controller 51 is configured and programmed to control the elevator 27 to move vertically between an upper stop position and a lower stop position LP when the article is transferred between the slide fork 29 and the shelves 11. The upper stop position includes a far-side upper stop position UP2 corresponding to the far-side storage portion 12b and a near-side upper stop position UP1 corresponding to the near-side storage portion 12a. The crane controller 51 controls the elevator 27 such that the far-side upper stop position UP2 is higher than the near-side upper stop position UP1.

In this automatic storage system 1, when an article W is to be transferred to a shelf 11 as a transport destination, upper stop positions are different between at the far-side storage portion 12b and the near-side storage portion 12a. In other words, the far-side upper stop position 12b when the article is transferred to or from the far-side storage portion 12b, whose extension and contraction length is longer and deflection is larger, is set higher than the near-side upper stop position 12a when the article is transferred to or from the near-side storage portion 12a, whose extension and contraction length is shorter and deflection is smaller. Accordingly, a lowering distance (or a hoisting distance) of the elevator 27 becomes shorter when the article W is unloaded to (or is loaded from) the near-side storage portion 12a. As a result, the hoisting and lowering time of the elevator 27 is significantly reduced, thus significantly reducing the time when transferring the article W.

The crane controller 51 sets the far-side upper stop position UP2 and the near-side upper stop position UP1 such that the higher the shelf 11 is, the larger a difference between the far-side upper stop position UP2 and the near-side upper stop position UP1 is.

In this case, if the elevator 27 is hoisted to a shelf at a higher position in order to transfer an article W to the shelf 11 at the higher position, the deflection of the left mast 25a and the right mast 25b guiding the elevator 27 becomes larger. And if the upper guide rail 21a is provided in the upper portion and the stacker crane 3 includes upper guide rollers, the left mast 25a and the right mast 25b may tilt due to a gap between the left mast 25a and the right mast 25b and the guide rollers. As a result, depending on the vertical position of the shelf 11 as a transport destination, a deflection amount of the slide fork 29 is changed. Accordingly, even if the vertical positions of the shelves 11 are different from each other, the far-side upper stop position UP2 and the near-side upper stop position UP1 are switched such that, even if vertical positions of the shelf 11 as a transport destination are different from each other, the transfer time is significantly reduced.

The automatic storage system 1 further includes a far-side stop-position detector 166b configured to detect the far-side upper stop position UP2, and a near-side stop-position detector 166a configured to detect the near-side upper stop position UP1. The crane controller 51 determines the upper stop position using either the far-side stop-position detector 166b or the near-side stop-position detector 166a, depending on whether an article W is to be stored to the far-side upper stop position 12b or the near-side upper stop position 12a.

In this case, since the upper stop positions are changed by switching the far-side stop-position detector 166b and the near-side stop-position detector 166a, it is possible to detect the far-side upper stop position and the near-side upper stop position at low cost.

Preferred embodiments of the present invention can be widely applied to an automatic storage system including a rack that can store an article at two storage portions in a depth direction, and a stacker crane.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automatic storage system for storing an article, comprising:
   a rack including a plurality of shelves arranged in a first horizontal direction and an up and down direction;

a stacker crane including a vehicle movable along the rack in the first horizontal direction, an elevator provided at the vehicle so as to move up and down, and a transfer device provided at the elevator and configured to hold the article and transfer the article between the transfer device and the shelves by expanding toward the shelves and contracting away from the shelves, each of the shelves including a near-side storage portion near the stacker crane and a far-side storage portion far from the stacker crane, the near-side storage portion and the far-side storage portion being arranged along a second horizontal direction perpendicular or substantially perpendicular to the first horizontal direction; and a crane controller configured and programmed to control the elevator to move vertically between an upper stop position and a lower stop position when the article is transferred between the transfer device and the shelves; wherein the upper stop position includes a far-side upper stop position corresponding to the far-side storage portion and a near-side upper stop position corresponding to the near-side storage portion; and the crane controller is programmed to control the elevator such that the far-side upper stop position is higher than the near-side upper stop position.

2. The automatic storage system according to claim 1, further comprising a stop position detector configured to detect whether or not the elevator is located at the upper stop position.

3. The automatic storage system according to claim 2, wherein the stop position detector detects whether or not the elevator is located at the lower stop position.

4. The automatic storage system according to claim 3, wherein the stop position detector includes:
   a reflector provided at the elevator; and
   a distance sensor provided at the vehicle facing upward, and configured to emit a laser beam toward the reflector and measure a distance to the elevator based on a reflected laser beam.

5. The automatic storage system according to claim 2, wherein the stop position detector includes:
   a reflector provided at the elevator; and
   a distance sensor provided at the vehicle facing upward, and configured to emit a laser beam toward the reflector and measure a distance to the elevator based on a reflected laser beam.

6. The automatic storage system according to claim 1, wherein the crane controller is programmed to set the far-side upper stop position and the near-side upper stop position such that the higher the shelf is, the larger a difference between the far-side upper stop position and the near-side upper stop position is.

7. The automatic storage system according to claim 3, wherein the crane controller is programmed to set the far-side upper stop position and the near-side upper stop position such that the higher the shelf is, the larger a difference between the far-side upper stop position and the near-side upper stop position is.

8. The automatic storage system according to claim 6, wherein the stop position detector includes:
   a far-side upper stop position detector configured to detect whether the elevator is located at the far-side upper stop position; and
   a near-side upper stop position detector configured to detect whether the elevator is located at the near-side upper stop position; wherein
   the crane controller is programmed to determine whether the elevator is located at the upper stop position using either the far-side upper stop position detector or the near-side upper stop position detector, depending on whether the article is to be stored to the far-side upper stop position or the near-side upper stop position.

9. The automatic storage system according to claim 8, wherein the far-side upper stop position detector includes a far-side photoelectric detector including a first light emitting portion and a first light receiving portion, and far-side detection elements provided to correspond to the shelves and configured to block light emitted from the first light emitting portion; and the near-side upper stop position detector includes a near-side photoelectric detector including a second light emitting portion and a second light receiving portion, and near-side detection elements provided to correspond to the shelves and configured to block light emitted from the second light emitting portion.

10. The automatic storage system according to claim 9, wherein
   the vehicle includes a first mast and a second mast configured to guide the elevator;
   the far-side photoelectric detector and the near-side photoelectric detector are disposed at two ends, in the first horizontal direction, of the elevator at a same height;
   the far-side detection elements are far-side shield plates disposed at the first mast so as to correspond to vertical positions of the shelves; and
   the near-side detection elements are near-side shield plates disposed at the second mast so as to correspond to vertical positions of the shelves.

11. The automatic storage system according to claim 10, wherein the far-side shield plates and the near-side shield plates include lower ends disposed at a same height, and the far-side shield plates include an upper end disposed higher than an upper end of the near-side shield plates.

12. The automatic storage system according to claim 3, wherein the stop position detector includes:
   a far-side upper stop position detector configured to detect whether or not the elevator is located at the far-side upper stop position; and
   a near-side upper stop position detector configured to detect whether or not the elevator is located at the near-side upper stop position; wherein
   the crane controller is programmed to determine whether the elevator is located at the upper stop position using either the far-side upper stop position detector or the near-side upper stop position detector, depending on whether the article is to be stored to the far-side upper stop position or the near-side upper stop position.

13. The automatic storage system according to claim 12, wherein the far-side upper stop position detector includes a far-side photoelectric detector including a first light emitting portion and a first light receiving portion, and a far-side detection element provided to correspond to the shelves and configured to block light emitted from the first light emitting portion; and the near-side upper stop position detector includes a near-side photoelectric detector including a second light emitting portion and a second light receiving portion, and a near-side detection element provided to correspond to the shelves and configured to block light emitted from the second light emitting portion.

14. The automatic storage system according to claim 13, wherein the vehicle includes a first mast and a second mast configured to guide the elevator;
the far-side photoelectric detector and the near-side photoelectric detector are disposed at two ends, in the first horizontal direction, of the elevator at a same height;
the far-side detection elements are far-side shield plates disposed at the first mast so as to correspond to vertical positions of the shelves; and
the near-side detection elements are near-side shield plates disposed at the second mast so as to correspond to vertical positions of the shelves.

15. The automatic storage system according to claim 14, wherein the far-side shield plates and the near-side shield plates include lower ends disposed at a same height, and the far-side shield plates includes an upper end disposed higher than an upper end of the near-side shield plates.

\* \* \* \* \*